(12) United States Patent
Bank et al.

(10) Patent No.: US 9,026,489 B2
(45) Date of Patent: May 5, 2015

(54) UPDATING A CONFERENCE INVITATION RESPONSIVE TO USER LOCATION

(71) Applicant: International Business Machines Corporation, Armonk, NY (US)

(72) Inventors: Judith H. Bank, Morrisville, NC (US); Erik S. Bryant, Wake Forest, NC (US); Gary Denner, Longwood (IE); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 13/690,367

(22) Filed: Nov. 30, 2012

(65) Prior Publication Data

US 2014/0156592 A1 Jun. 5, 2014

(51) Int. Cl.
*G06F 17/30* (2006.01)

(52) U.S. Cl.
CPC .............................. *G06F 17/30345* (2013.01)

(58) Field of Classification Search
CPC ..... H04M 3/565; H04M 3/567; H04M 3/568; H04M 3/42008; G06Q 10/10; G06Q 10/109; G06Q 10/1093; G06Q 10/1095; H04L 12/1818; H04L 12/1822; H04L 12/1827; H04L 12/188
USPC .................. 707/609, 654; 370/256, 260–261; 379/93.21, 158, 202.01, 205.01
See application file for complete search history.

(56) References Cited

U.S. PATENT DOCUMENTS

| | | | |
|---|---|---|---|
| 6,282,703 B1 | 8/2001 | Meth et al. | |
| 7,296,088 B1 * | 11/2007 | Padmanabhan et al. | 709/238 |
| 7,711,846 B2 * | 5/2010 | Padmanabhan et al. | 709/238 |
| 8,126,129 B1 * | 2/2012 | McGuire | 379/202.01 |
| 8,521,128 B1 * | 8/2013 | Welsh et al. | 455/404.2 |
| 8,619,636 B1 * | 12/2013 | Sarkar | 370/260 |
| 2003/0036962 A1 * | 2/2003 | Holt | 705/26 |
| 2006/0031417 A1 | 2/2006 | Narin | |
| 2006/0045030 A1 * | 3/2006 | Bieselin | 370/260 |
| 2006/0062367 A1 * | 3/2006 | Christenson et al. | 379/202.01 |
| 2006/0089160 A1 * | 4/2006 | Othmer | 455/457 |
| 2006/0171337 A1 * | 8/2006 | Shaffer et al. | 370/261 |

(Continued)

OTHER PUBLICATIONS

Whitzmeeting.com; "Audio & Web conference FAQ, Unitified Conferencing, Whitzmeeting.com"; Printed Nov. 15, 2012; Copyright 2010; <http://www.whizmeeting.com/confernecefaq.aspx>.

*Primary Examiner* — Hanh Thai
(74) *Attorney, Agent, or Firm* — Daniel R. Simek

(57) ABSTRACT

Embodiments of the present invention disclose a computer method, computer program product, and computer system for automatically updating a conference invitation with contact information corresponding to a user's geographical location. A user on a client device accepts an invitation to a conference. The geographical location of the client device is determined and stored in a database. Using the location of the client device, a conference information database is accessed, and location specific conference contact information is determined. The location specific conference contact information is then input into the conference invitation so that the user has location specific conference contact information. In another embodiment, when the user accesses the conference invitation, the location of the client device is determined, and if the location has changed from when the invitation was accepted, a new location is determined. The conference contact information for the new location is determined and input into the invitation.

18 Claims, 4 Drawing Sheets

(56) References Cited

U.S. PATENT DOCUMENTS

2006/0236257 A1* 10/2006 Othmer et al. ............... 715/774
2007/0162460 A1   7/2007 Long
2008/0114543 A1*  5/2008 Vishnu .......................... 701/209
2008/0304631 A1* 12/2008 Vilis et al. ...................... 379/45
2009/0265716 A1  10/2009 Prashanth
2010/0229081 A1   9/2010 Rothbucher
2011/0007887 A1   1/2011 Green et al.
2011/0078203 A1   3/2011 Cohen et al.
2012/0047152 A1*  2/2012 Purdy ........................... 707/754
2012/0321060 A1* 12/2012 Lucey et al. ................ 379/93.21
2013/0002805 A1*  1/2013 Andresen et al. ........... 348/14.07
2013/0041953 A1*  2/2013 Renner et al. ................. 709/204
2013/0095855 A1*  4/2013 Bort ........................... 455/456.2

* cited by examiner

UPDATING A CONFERENCE INVITATION RESPONSIVE TO USER LOCATION

FIELD OF THE INVENTION

The present invention relates generally to the field of teleconferencing and web conferencing, and more particularly to automatically updating a conference invitation with contact information corresponding to the location of a user.

BACKGROUND OF THE INVENTION

Many projects require the participation of multiple individuals who often need to meet with each other in order to achieve the goals of their project. In many instances, the individuals working on the project are not located in close geographic proximity to each other. Therefore, instead of face-to-face meetings, the individuals working on the project may have a teleconference or web conference. Conferencing software permits multiple participants across different locations and time zones to converge in a shared conference. In a teleconference system, each participant dials a telephone number to reach the host of the conference, and then enters a pass code to access the specific conference in the system. Specific call-in numbers and pass codes exist for different geographic locations. Some devices that a participant may use to access the conference have location awareness capabilities that can passively or actively determine the location of the device and participant. For example, client-based location awareness uses Internet Protocol (IP) based profiling, which uses the participant's network information (Media Access Control (MAC) address, subnet) to determine the geographical location of the participant.

SUMMARY

Embodiments of the present invention disclose a computer method, computer program product, and computer system for automatically updating a conference invitation with contact information corresponding to a user's geographical location. A user on a client device accepts an invitation to a conference. The geographical location of the client device is determined and stored in a database. Using the location of the client device, a conference information database is accessed, and location specific conference contact information is determined. The location specific conference contact information is then inputted into the conference invitation so that the user has location specific conference contact information. In another embodiment, when the user accesses the conference invitation, the location of the client device is determined, and if the location has changed from when the invitation was accepted, a new location is determined. The conference contact information for the new location is determined and inputted into the invitation.

DETAILED DESCRIPTION

Figure 1:
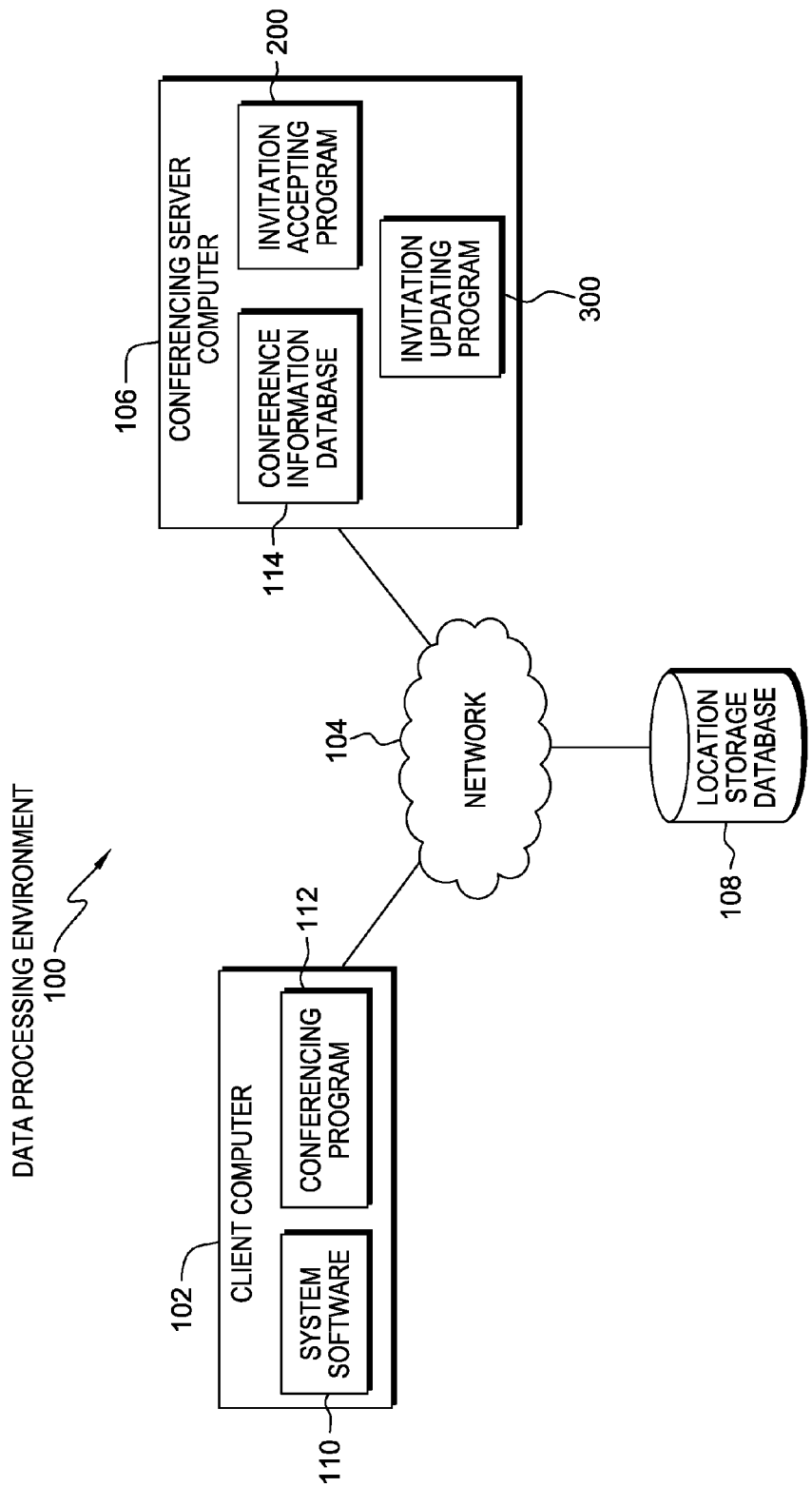
FIG. 1 is a functional block diagram of a data processing environment in accordance with an embodiment of the present invention.

Embodiments of the present invention recognize that as an individual travels, it may be difficult to keep track of the correct conference contact information for his or her different geographical locations. For example, it may be time consuming or infeasible for an individual to manually look up conference call-in numbers and participant pass codes for different locations while traveling. Embodiments of the present invention update conference contact information in accordance with an individual's current geographic location, without requiring that the individual manually search for the appropriate conference contact information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a data processing environment 100, in accordance with one embodiment of the present invention.

Data processing environment 100 includes client computer 102, network 104, conferencing server computer 106, and location storage database 108. In various embodiments of the present invention, client computer 102 may be a workstation, personal computer, personal digital assistant, mobile phone, or any other device capable of executing program instructions. In general, client computer 102 is representative of any electronic device or combination of electronic devices capable of executing machine-readable program instructions, as described in greater detail with regard to FIG. 4. System software 110 is located on client computer 102 and may exist in the form of operating system software, which may be Windows®, LINUX®, and other application software such as internet applications and web browsers. Conferencing program 112 is located on client computer 102 and allows a user of client computer 102 to accept conference invitations and communicate with other participants in a shared conference. In one embodiment, conferencing program 112 includes location awareness capabilities that keep track of the geographical location of client computer 102. The geographic location of client computer 102 may be tracked using WiFi networks, mobile phone towers, and Internet Protocol (IP) addresses associated with client computer 102.

Network 104 can be, for example, a local area network (LAN), a telecommunications network, a wide area network (WAN) such as the Internet, or a combination of the three, and include wired, wireless, or fiber optic connections. In general, network 104 can be any combination of connections and protocols that will support communications between client computer 102, conferencing server computer 106, and location storage database 108 in accordance with a desired embodiment of the present invention.

Conferencing server computer 106 is utilized to host conferences between multiple participants (e.g., a web conference or a teleconference). Conferencing server computer 106 can be a desktop computer, specialized computer server, or any other computer system known in the art. In certain embodiments, conferencing server computer 106 represents a computer system utilizing clustered computers and components (e.g., database server computers, application server computers, etc.) that act as a single pool of seamless resources when accessed through network 104. In general, conferencing server computer 106 is representative of any electronic device or combination of electronic devices capable of executing machine-readable program instructions, as described in greater detail with regard to FIG. 4.

Conference server computer 106 includes conference information database 114, invitation accepting program 200, and invitation updating program 300. Conference information database 114 is utilized to store conference call-in numbers, participant access codes, and other information for a plurality of different geographical regions in accordance with embodiments of the present invention. Conferencing program 112 can communicate with conferencing server computer 106 and conference information database 114 via network 104 to communicate information relating to a teleconference or web conference. Conference information database 114 can be implemented with any type of database storage that is capable of storing data which may be accessed and utilized by client computer 102 and conferencing server computer 106, such as a database server, a hard disk drive, or flash memory.

Figure 2:
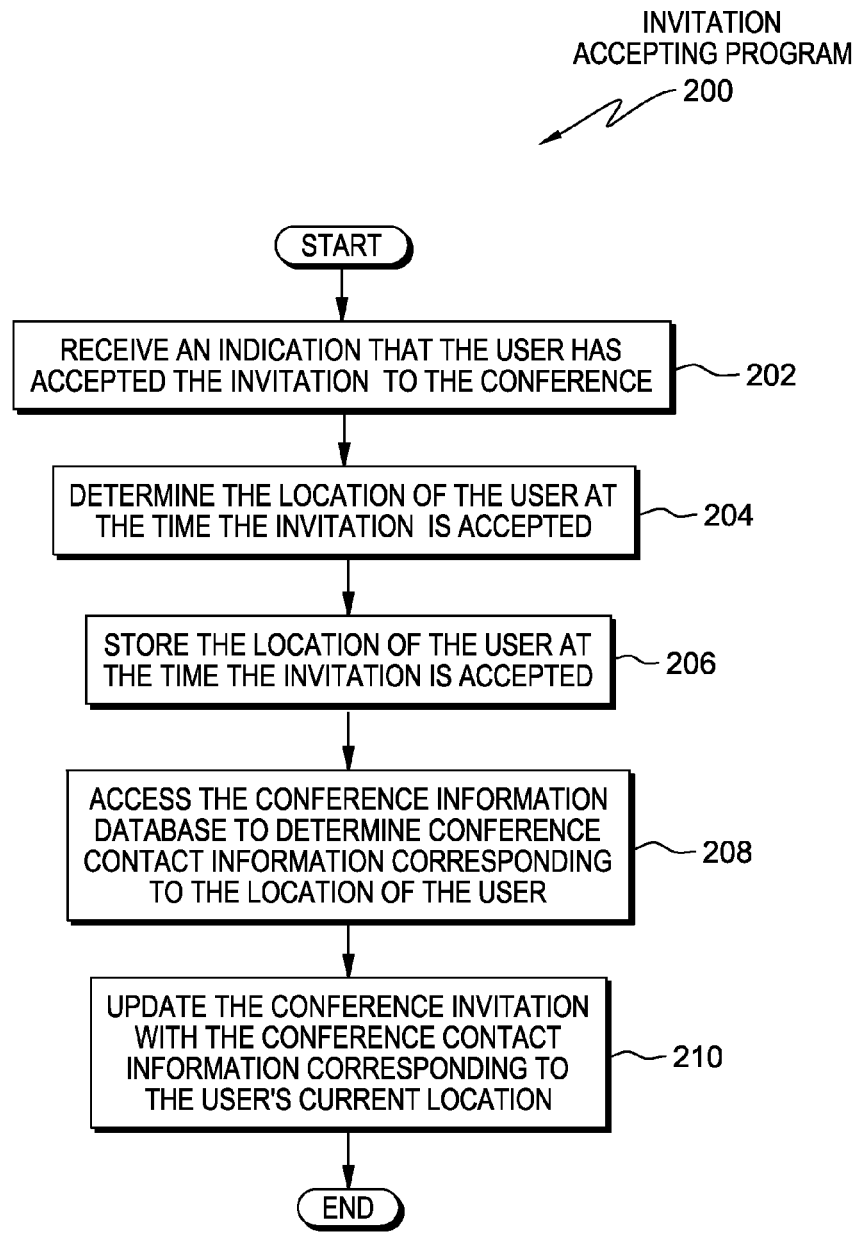
FIG. 2 is a flowchart depicting operational steps of a program for updating conference contact information in a conference invitation corresponding to the geographical location of the user at the time the invitation is accepted.

Invitation accepting program 200 is utilized to accept an invitation to a conference and update the conference invitation with conference contact information corresponding to the geographical location of the user, as discussed in greater detail with regard to FIG. 2. Invitation updating program 300 is utilized to update the conference contact information in a conference invitation responsive to a user's change in geographical location, as discussed in greater detail with regard to FIG. 3.

Location storage database 108 is utilized to store the geographic location of each user that accepts a conference invitation (i.e., each participant in the conference). Location storage database 108 can be implemented with any database storage device that is capable of storing geographical location information that can be accessed and utilized by conferencing program 112 and conferencing server computer 106, such as a database server, a hard disk drive, or flash memory. In certain embodiments, location storage database 108 is located on conferencing server computer 106.

FIG. 2 is a flowchart depicting operational steps of invitation accepting program 200 in accordance with an exemplary embodiment of the present invention. In this embodiment, invitation accepting program 200 is initiated when a user of client computer 102 accepts an invitation to a conference, and invitation accepting program 200 updates the conference invitation with conference contact information corresponding to the geographical location of the user. The invitation may be, for example, an invitation to a teleconference or a web conference.

In step 202, invitation accepting program 200 receives an indication that the user has accepted the invitation to the conference. The conference invitation is received and accepted by the user in conferencing program 112 on client computer 102. In step 204, invitation accepting program 200 determines the location of the user at the time the invitation is accepted. In this exemplary embodiment, conferencing program 112 utilizes the IP address of client computer 102 to determine the geographic location of client computer 102 and communicate the geographic location information to invitation accepting program 200. In other embodiments, different location awareness capabilities and techniques can be utilized, such as a global positioning system (GPS) receiver or multilateration of radio signals between communication towers (e.g., cellular towers). In an alternate embodiment, invitation accepting program 200 prompts the user to define the geographical location of client computer 102.

In step 206, invitation accepting program 200 stores the location of the user at the time the invitation is accepted. In this exemplary embodiment, the geographic location of the user is stored on location storage database 108 and can be accessed by invitation accepting program 200 and conferencing program 112.

In step 208, invitation accepting program 200 accesses conference information database 114 to determine conference contact information corresponding to the location of the user that was determined in step 204. In this exemplary embodiment, the conference contact information includes a geographic location-specific call-in telephone number, participant access code, and other information that may be included in a conference invitation. In the event conference contact information is not defined for a specific geographic location, invitation accepting program 200 identifies the conference contact information corresponding to the geographic location closest to client computer 102.

In step 210, invitation accepting program 200 updates the conference invitation with the conference contact information corresponding to the user's current location. In this exemplary embodiment, when invitation accepting program 200 updates the conference contact information in the conference invitation in step 210, the conference contact information that was initially in the conference invitation is replaced with the location-specific conference contact information.

Accordingly, in this exemplary embodiment, when a user accepts a conference invitation, invitation accepting program 200 operates to populate the conference invitation with conference contact information that corresponds with the user's geographic location at the time of accepting the conference invitation.

Figure 3:
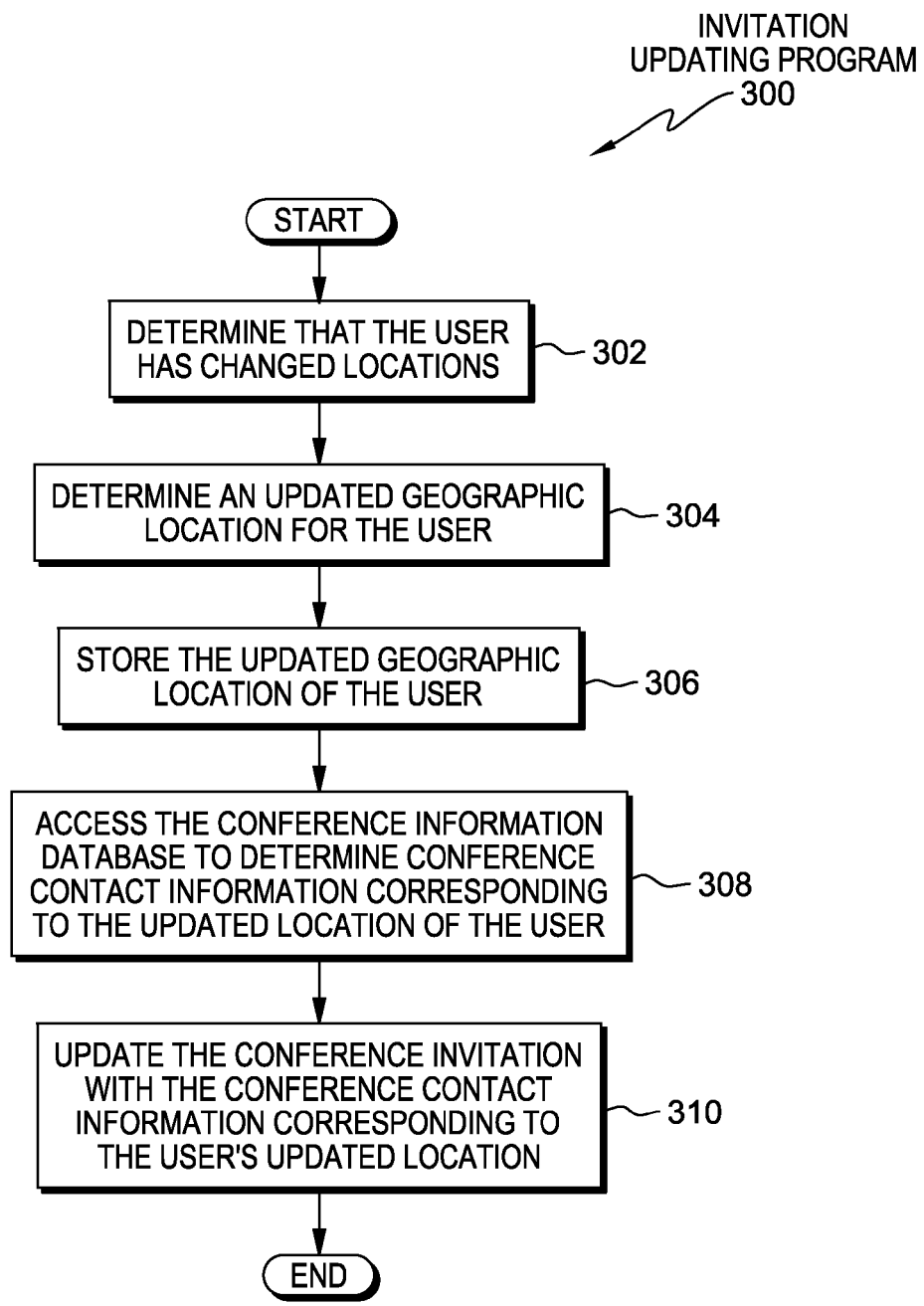
FIG. 3 is a flowchart depicting operational steps of a program for updating conference contact information in a conference invitation responsive to a change in the geographical location of a user.

FIG. 3 is a flowchart depicting the operational steps of invitation updating program 300 in accordance with an exemplary embodiment of the present invention. In this embodiment, invitation updating program 300 updates the conference contact information in a conference invitation responsive to a change in the user's geographic location, and is performed subsequent to performing invitation accepting program 200. Invitation updating program 300 is initiated when the user opens a previously accepted conference invitation. For example, invitation updating program can be initiated by the user of client computer 102 accessing the previously accepted conference invitation in conference program 112.

In step 302, invitation updating program 300 determines that the user has changed locations. In this exemplary embodiment, invitation updating program 300 determines that the geographic location of client computer 102 is different than the location that is stored for client computer 102 in location storage database 108 (i.e., the location of client computer 102 when the user accepted the conference invitation).

In step 304, invitation updating program 300 determines an updated location for the user. In this embodiment, invitation updating program 300 determines the geographic location of client computer 102, as previously discussed with regard to step 204 of invitation accepting program 200.

In step 306, invitation updating program 300 stores the updated geographic location of the user, as determined in step 304, in location storage database 108. When the updated geographic location is stored in location storage database 108, the previous geographic location information for client computer 102 can be removed.

In step 308, invitation updating program 300 accesses conference information database 114 to determine conference contact information corresponding to the updated location of the user (e.g., the appropriate location-specific call-in number and pass code). In this embodiment, invitation updating program 300 determines conference contact information corresponding to the geographic location of client computer 102, as previously discussed with regard to step 208 of invitation accepting program 200.

In step 310, invitation updating program 300 updates the conference invitation with the conference contact information corresponding to the user's updated location. In one embodiment, when invitation updating program 300 updates the conference contact information in the conference invitation in step 310, the conference contact information that was input into the invitation in step 210 of invitation accepting program 200 is replaced with the updated conference contact information determined in step 308.

Accordingly, in this exemplary embodiment, when a user accesses a conference invitation that has been previously accepted, invitation updating program 300 operates to update the conference invitation with conference contact information corresponding to the users current geographic location.

In one embodiment of the present invention, invitation accepting program 200 and invitation updating program 300 allow the conference invitation to be automatically updated through an intelligent system that does not require user intervention. In an exemplary embodiment, invitation accepting program 200 and invitation updating program 300 ensure that a user that changes geographical locations will have a conference invitation updated with the correct conference contact information without having to manually determine conference contact information for different geographic locations.

Figure 4:
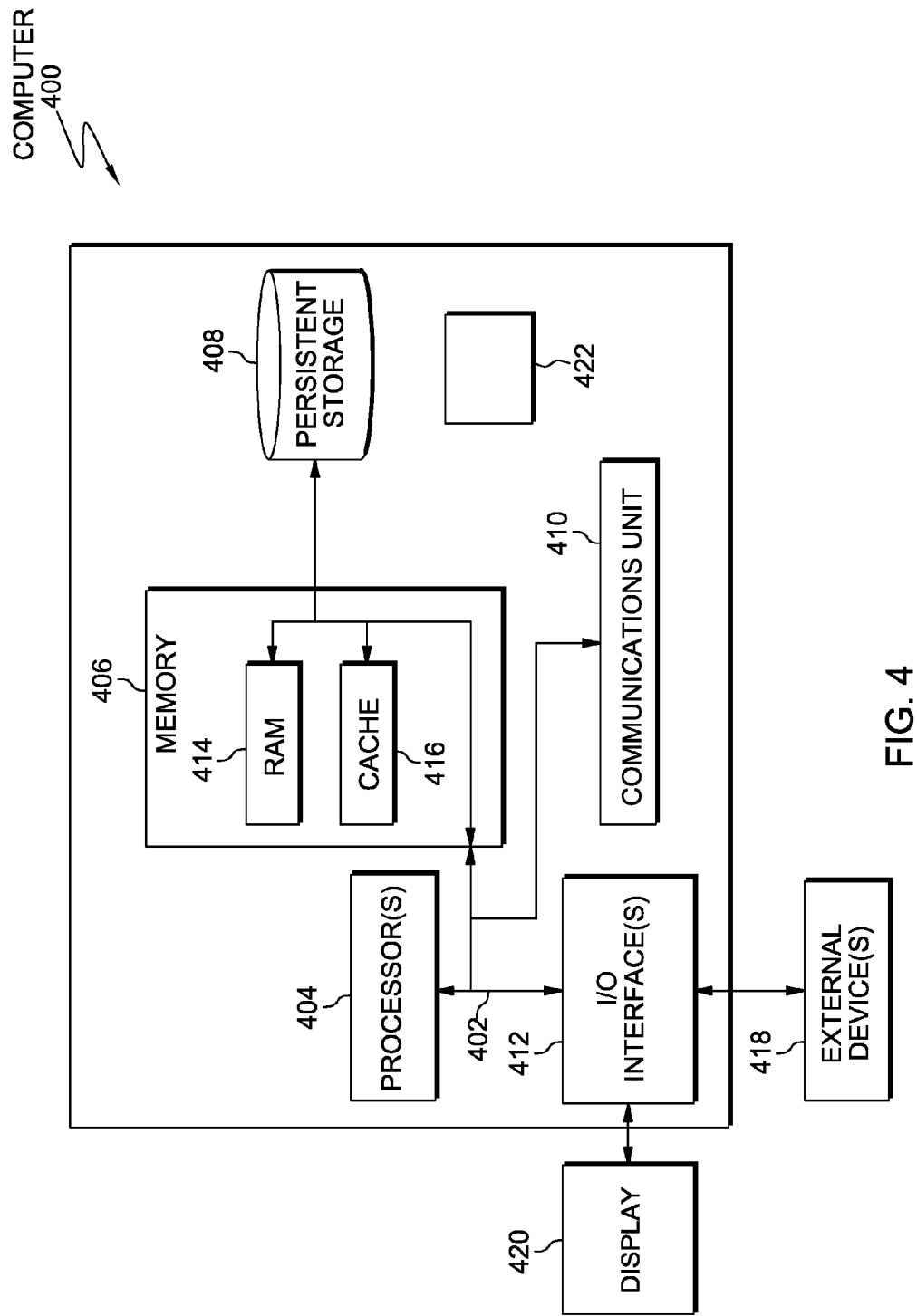
FIG. 4 depicts a block diagram of components of the computers of FIG. 1 in accordance with an embodiment of the present invention.

FIG. 4 depicts a block diagram of components of computer 400, which is representative of client computer 102 and conferencing server computer 106, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Software and data 422 is stored in persistent storage 408 for access and/or execution by processor(s) 404 via one or more memories of memory 406. With respect to client computer 102, software and data 422 includes system software 110 and conferencing program 112. With respect to conferencing server computer 106, software and data 422 includes conference information data base 114, invitation accepting program 200, and invitation updating program 300.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data 422 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer method for updating a conference invitation with contact information corresponding to a geographical location of a user, the computer method comprising the actions of:

receiving an indication that the user, utilizing a computing device, has accepted the conference invitation;

determining the geographical location of the user based on location information corresponding to the computing device utilized by the user, wherein the location information includes one or more of: IP address ranges of service providers associated with the computing device, WiFi connection points utilized by the computing device, and mobile telephony towers utilized by the computing device;

storing the determined geographical location of the user in a location storage database;

accessing a conference information database and determining conference contact information corresponding to the determined geographical location of the user;

updating the conference invitation with the conference contact information corresponding to the determined geographic location of the user;

receiving a request to access the conference invitation from the user;

determining a current geographical location of the user, wherein the current geographical location of the user is based on location information corresponding to the computing device utilized by the user at the time the user requested to access the conference invitation;

determining that the current geographical location of the user is different than the geographical location of the user at the time that the user accepted the conference invitation; and in response to determining that the current geographical location of the user is different than the geographical location of the user at the time that the user accepted the conference invitation, updating the conference invitation with conference contact information corresponding to the current geographical location of the user.

2. The computer method of claim 1, wherein the conference contact information comprises a location specific call-in telephone number and a participant access code.

3. The computer method of claim 1, wherein the action of updating the conference invitation with conference contact information corresponding to the current geographical location of the user further comprises the actions of:
sending conference contact information corresponding to the current geographical location of the user to the user.

4. The computer method of claim 1, further comprising the actions of:
prior to updating the conference invitation with the conference contact information corresponding to the geographic location of the user, removing conference contact information that is in the conference invitation.

5. The computer method of claim 1, wherein the action of determining the geographical location of the user comprises receiving a geographic location inputted by the user.

6. The computer method of claim 1, wherein the action of determining the geographical location of the user comprises utilizing an IP address of the computing device that the user utilized to accept the conference invitation.

7. A computer program product for updating a conference invitation with contact information corresponding to a geographical location of a user, the computer program product comprising:
one or more computer-readable storage media and program instructions stored on the one or more computer-readable storage media, the program instructions comprising:
program instructions to receive an indication that the user, utilizing a computing device, has accepted the conference invitation;
program instructions to determine the geographical location of the user based on location information corresponding to the computing device utilized by the user, wherein the location information includes one or more of: IP address ranges of service providers associated with the computing device, WiFi connection points utilized by the computing device, and mobile telephony towers utilized by the computing device;
program instructions to store the determined geographical location of the user in a location storage database;
program instructions to access a conference information database and determining conference contact information corresponding to the determined geographical location of the user;
program instructions to update the conference invitation with the conference contact information corresponding to the determined geographic location of the user;
program instructions to receive a request to access the conference invitation from the user;
program instructions to determine a current geographical location of the user, wherein the current geographical location of the user is based on location information corresponding to the computing device utilized by the user at the time the user requested to access the conference invitation;
program instructions to determine that the current geographical location of the user is different than the geographical location of the user at the time that the user accepted the conference invitation; and
in response to determining that the current geographical location of the user is different than the geographical location of the user at the time that the user accepted the conference invitation, program instructions to update the conference invitation with conference contact information corresponding to the current geographical location of the user.

8. The computer program product of claim 7, wherein the conference contact information comprises a location specific call-in telephone number and a participant access code.

9. The computer program product of claim 7, wherein the program instructions to update the conference invitation with conference contact information corresponding to the current geographical location of the user, further comprises program instructions to:
send the conference contact information corresponding to the current geographical location of the user to the user.

10. The computer program product of claim 7, further comprising program instructions, stored on the one or more computer-readable storage media, to:
prior to updating the conference invitation with the conference contact information corresponding to the geographic location of the user, remove conference contact information that is in the conference invitation.

11. The computer program product of claim 7, wherein the program instructions to determine the geographical location of the user comprise program instructions to receive a geographic location inputted by the user.

12. The computer program product of claim 7, wherein the program instructions to determine the geographical location of the user comprise program instructions to utilize an IP address of the computing device that the user utilized to accept the conference invitation.

13. A computer system for updating a conference invitation with contact information corresponding to a geographical location of a user, the computer system comprising:
one or more computer processors;
one or more computer-readable tangible storage devices;
program instructions stored on the one or more computer-readable tangible storage devices for execution by at least one of the one or more processors, the program instructions comprising:
program instructions to receive an indication that the user, utilizing a computing device, has accepted the conference invitation;
program instructions to determine the geographical location of the user based on location information corresponding to the computing device utilized by the user, wherein the location information includes one or more of: IP address ranges of service providers associated with the computing device, WiFi connection points utilized by the computing device, and mobile telephony towers utilized by the computing device;
program instructions to store the determined geographical location of the user in a location storage database;
program instructions to access a conference information database and determining conference contact information corresponding to the determined geographical location of the user;
program instructions to update the conference invitation with the conference contact information corresponding to the determined geographic location of the user;
program instructions to receive a request to access the conference invitation from the user;
program instructions to determine a current geographical location of the user, wherein the current geographical location of the user is based on location information corresponding to the computing device utilized by the user at the time the user requested to access the conference invitation;
program instructions to determine that the current geographical location of the user is different than the geographical location of the user at the time that the user accepted the conference invitation; and in response to determining that the current geographical location of the user is different than the geographical location of the user at the time that the user accepted the conference invitation, program instructions to update the conference invitation with conference contact information corresponding to the current geographical location of the user.

14. The computer system of claim 13, wherein the conference contact information comprises a location specific call-in telephone number and a participant access code.

15. The computer system of claim 13, wherein the program instructions to update the conference invitation with conference contact information corresponding to the current geographical location of the user, further comprises program instructions to:

send the conference contact information corresponding to the current geographical location of the user to the user.

16. The computer system of claim 13, further comprising program instructions, stored on the one or more computer-readable storage media for execution by at least one of the one or more processors, to:

prior to updating the conference invitation with the conference contact information corresponding to the geographic location of the user, remove conference contact information that is in the conference invitation.

17. The computer system of claim 13, wherein the program instructions to determine the geographical location of the user comprise program instructions to receive a geographic location inputted by the user.

18. The computer system of claim 13, wherein the program instructions to determine the geographical location of the user comprise program instructions to utilize an IP address of the computing device that the user utilized to accept the conference invitation.

* * * * *